US008298107B1

(12) United States Patent
Brookins

(10) Patent No.: US 8,298,107 B1
(45) Date of Patent: Oct. 30, 2012

(54) RETROFIT KIT FOR AN ALLISON TRANSMISSION

(76) Inventor: Ernie Brookins, West Fargo, ND (US)

(*) Notice: Subject to any disclaimer, the term of this patent is extended or adjusted under 35 U.S.C. 154(b) by 0 days.

(21) Appl. No.: 13/040,491

(22) Filed: Mar. 4, 2011

(51) Int. Cl.
*F16H 47/04* (2006.01)
*F16H 3/62* (2006.01)
(52) U.S. Cl. .......................................... 475/83; 475/275
(58) Field of Classification Search .................. 475/275, 475/72–83
See application file for complete search history.

(56) References Cited

U.S. PATENT DOCUMENTS

| | | | | |
|---|---|---|---|---|
| 4,246,806 A | * | 1/1981 | Reynolds et al. | 477/69 |
| 5,246,409 A | * | 9/1993 | Flemming et al. | 475/276 |
| 6,170,587 B1 | * | 1/2001 | Bullock | 180/69.6 |
| 6,276,449 B1 | * | 8/2001 | Newman | 166/53 |
| 7,824,290 B1 | * | 11/2010 | Brookins | 475/107 |

* cited by examiner

*Primary Examiner* — Tisha Lewis
(74) *Attorney, Agent, or Firm* — David Alan Lingbeck

(57) ABSTRACT

A retrofit kit for an Allison transmission for converting a standard Allison Transmission into a variable speed hybrid using external pressure. The retrofit kit for an Allison transmission includes a main housing; gear sets being disposed in the main housing and including rotational members; clutches being in operable communication to the gear sets; a hydrostatic pump being in operable communication to at least one of the rotational members and having ports; and a fluid circuit being in fluid communication to the hydrostatic pump through the ports and to at least one of the clutches.

19 Claims, 3 Drawing Sheets

RETROFIT KIT FOR AN ALLISON TRANSMISSION

BACKGROUND OF THE INVENTION

1. Field of the Invention

The present invention relates to retrofit transmission kits and more particularly pertains to a new retrofit kit for an Allison transmission for converting a standard electronic automatic Allison transmission into a variable speed transmission by replacing the standard torque convertor, front pump, forward clutches and valve body with a variable speed torque convertor that is operated using external rather than internal pressure.

2. Description of the Prior Art

The use of retrofit transmission kits is known in the prior art. More specifically, retrofit transmission kits heretofore devised and utilized are known to consist basically of familiar, expected and obvious structural configurations, notwithstanding the myriad of designs encompassed by the crowded prior art which have been developed for the fulfillment of countless objectives and requirements.

The prior art includes torque converters and transmissions comprising a case or housing having input and output shafts being in operable communication to gear sets such as planetary carriers and planetary gears, sun gears and ring gears with standard clutches such as friction plates being used to couple the gear sets to manipulate the power to the output shaft which drive the drive wheel or wheels. While these devices fulfill their respective, particular objectives and requirements, the aforementioned patents do not disclose a new retrofit kit for an Allison transmission.

SUMMARY OF THE INVENTION

The general purpose of the present invention, which will be described subsequently in greater detail, is to provide a new retrofit kit for an Allison transmission which has many of the advantages of the retrofit transmission kits mentioned heretofore and many novel features that result in a new retrofit kit for an Allison transmission which is not anticipated, rendered obvious, suggested, or even implied by any of the prior art retrofit transmission kits, either alone or in any combination thereof. The present invention includes a main housing; gear sets being disposed in the main housing and including rotational members; clutches being in operable communication to the gear sets; a hydrostatic pump being in operable communication to at least one of the rotational members and having ports; and a fluid circuit being in fluid communication to the hydrostatic pump through the ports and to at least one of the clutches. None of the prior art includes the combination of the elements of the present invention.

There has thus been outlined, rather broadly, the more important features of the retrofit kit for an Allison transmission in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new retrofit kit for an Allison transmission which has many of the advantages of the retrofit transmission kits mentioned heretofore and many novel features that result in a new retrofit kit for an Allison transmission which is not anticipated, rendered obvious, suggested, or even implied by any of the prior art retrofit transmission kits, either alone or in any combination thereof.

Still another object of the present invention is to provide a new retrofit kit for an Allison transmission for replacing the standard torque converter with a variable speed torque converter retrofit kit thereby changing the Allison transmission into a variable speed transmission using external pressure.

Still yet another object of the present invention is to provide a new retrofit kit for an Allison transmission that increases the fuel efficiency by a significant amount.

Even still another object of the present invention is to provide a new retrofit kit for an Allison transmission that replaces the standard torque convertor, front pump, forward clutches and valve body with a variable speed torque convertor that is operated using external rather than internal pressure.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
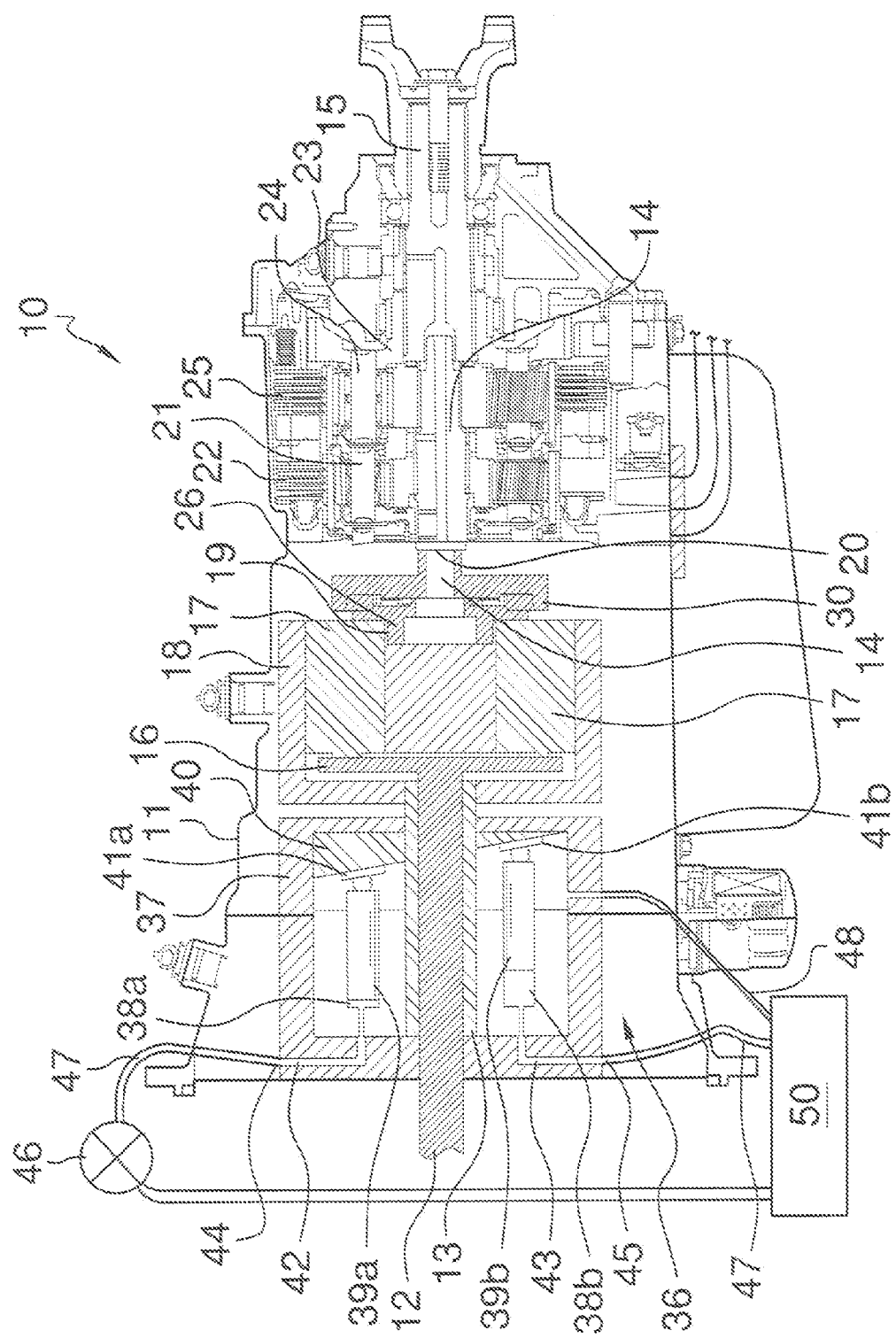
FIG. 1 is a cross-sectional side elevational view of a new retrofit kit for an Allison transmission according to the present invention.
Figure 2:
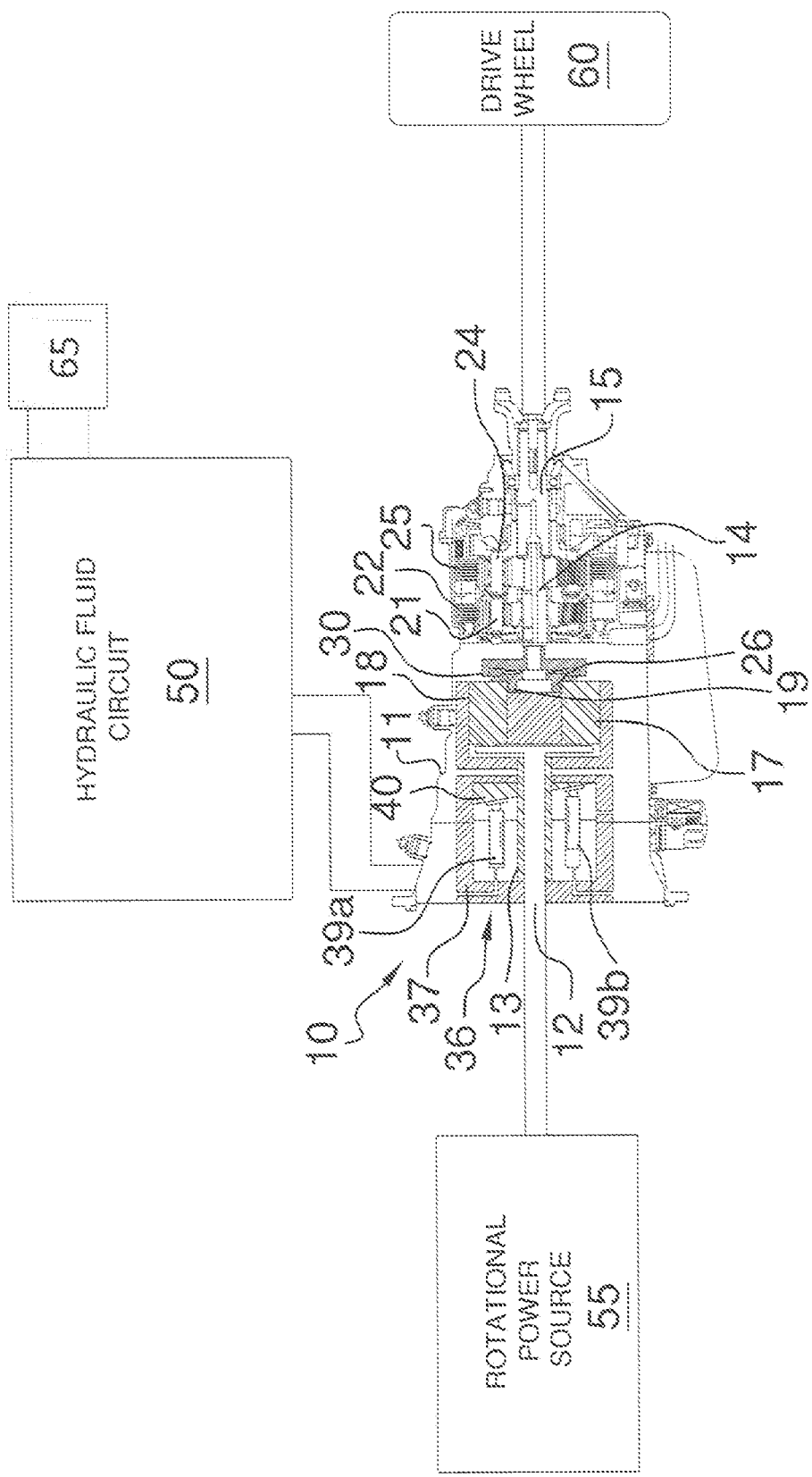
FIG. 2 is a schematic diagram of the present invention.
Figure 3:
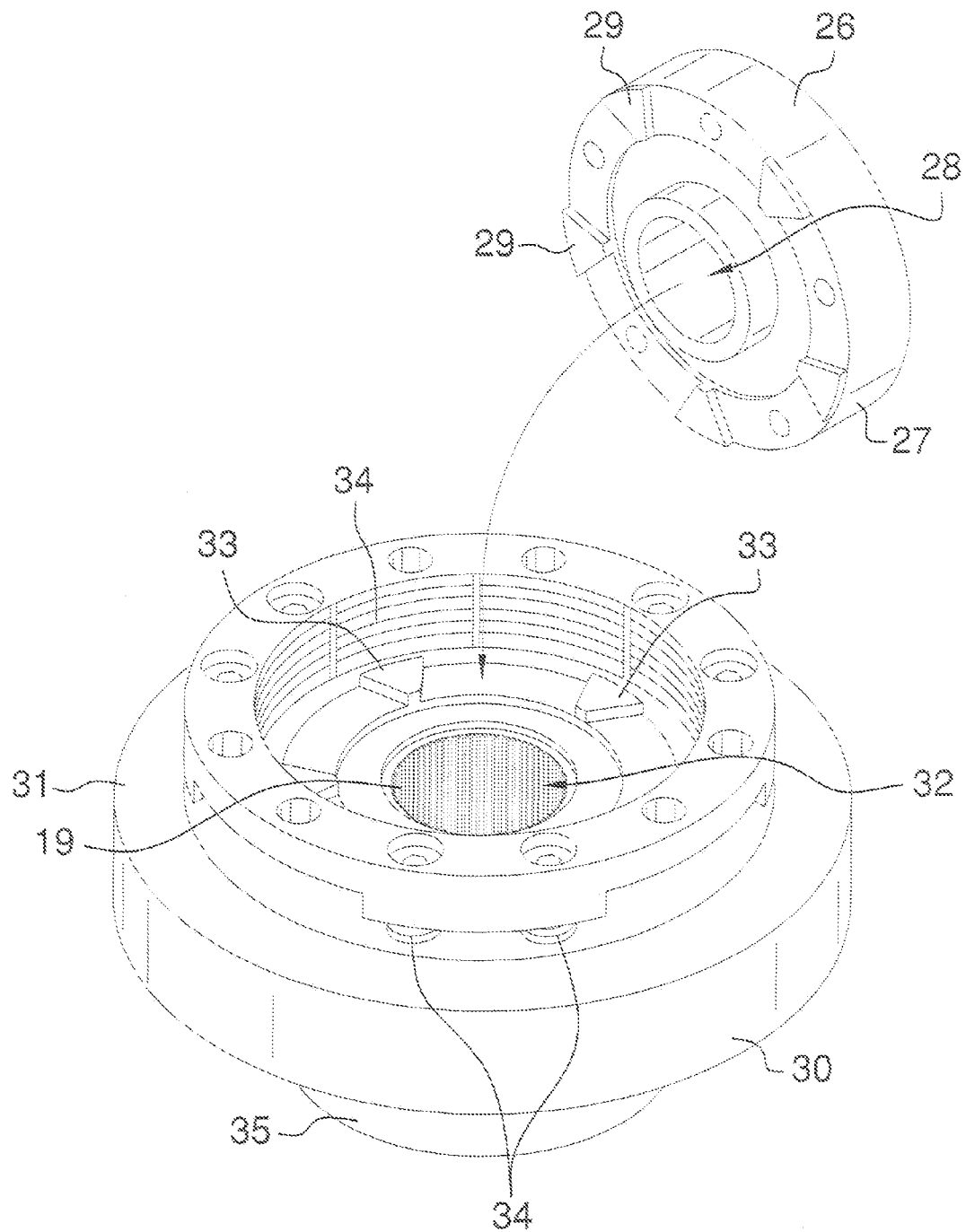
FIG. 3 is a perspective view of the cone clutch and the clutch lockup member.

With reference now to the drawings, and in particular to FIGS. 1 through 3 thereof, a new retrofit kit for an Allison transmission embodying the principles and concepts of the present invention and generally designated by the reference numeral 10 will be described.

As best illustrated in FIGS. 1 through 3, the retrofit kit for an Allison transmission 10 generally comprises a main housing 11 having open ends, and also comprises planetary gear sets, a hydrostatic pump 36, a first rotational member 12 in the form of a first shaft 12, a second rotational member 13 in the form of a second shaft 13 and a hydraulic fluid circuit 50. The first planetary gear set includes the three main components that correspond to the inputs/outputs; first planetary carrier 16 with a first set of planetary gears 17, a sun gear 19, and a ring gear 18. The hydrostatic pump 36 through the hydraulic fluid circuit 50 may be used to control the rotation of one of the second shaft 13 and the third shaft 14.

For purposes of illustration, the functionality will be described in the context of a vehicular application wherein a rotational power source is an input interconnected to the first rotational member 12 in the form of the first shaft. Furthermore, one or more drive wheels 60 are interconnected as an output to a fourth rotational member 15 in the form of a fourth shaft. The first shaft 12 is coupled to a first planetary carrier 16, the third rotational member 14 is coupled to the sun gear 19 and the ring gear 18 is coupled to a second rotational member 13 for the hydrostatic pump 36. If the ring gear 18 is held stationary, rotation of the first planetary carrier 16 will result in rotation of the sun gear 19. If the first planetary carrier 16 is held stationary, rotation of the ring gear 18 will result in the rotation of the sun gear 19. If any one of the three main components of the first planetary gear set is allowed to rotate freely, no rotational power may be transferred between the other 2 components. If no load is present on the ring gear 18 and a load is present on the sun gear 19, rotational power delivered to the first planetary carrier 16 will result in rotation of the first planetary carrier 16 about the stationary sun gear 19 and ring gear 18 will rotate freely.

The third component of the first planetary gear set, the ring gear 18 is coupled to the hydrostatic pump 36, an axial piston pump with reciprocating pistons 39a,b. The ring gear 18 is interconnected to the second rotational member 13 in the form of a hollow shaft which is concentrically disposed relative to and disposed about the first shaft 12. The hollow shaft is interconnected to a cylinder block 37. Within a housing 49 is an angled swash plate 40 and the cylinder block 37. Within the cylinder block 37 are a plurality of axial bores 38a,b. A plurality of pistons 39a,b are slidably disposed in the bores 38a,b. Each of the pistons 39a,b has a shoe 41a,b for slidably interfacing against the swash plate 40. Hydraulic fluid passage 42 may be a single passage or a network of passages in fluid communication with a first port 44 on the hydrostatic pump 36. Hydraulic fluid passage 43 may be a single passage in fluid communication with a second port 45 on the hydrostatic pump 36. The pistons 39a,b ride along the swash plate 40 during rotation of the cylinder block 37. They experience a compressive force for one half of each rotation of the cylinder block 37. This compressive force corresponds to the rotation of the pistons 39a,b. The hydraulic fluid passage 42 is in fluid communication with the first port 44. The main case 11 contains hydraulic fluid passage 43 which is in fluid communication with the axial bores 38a,b and the second port 45. All the axial bores 38a,b will rotate in and out of fluid communication with the hydraulic fluid passages 42,43. As the pistons 39a,b undergo a compression stroke, the hydraulic fluid may be forced through hydraulic fluid passage 42 and the first port 44 may be the high pressure output port of the hydrostatic pump 36. As the pistons 39a,b undergo an expansion stroke, the fluid may be drawn into hydraulic fluid passage 43 and second port 45 may be the relatively low pressure input port. To ensure that the pistons 39a,b undergoing an expansion stroke remain in continuous contact with the swash plate 40, the hydraulic fluid circuit 50 may provide hydraulic fluid to the second port 45 under a pressure. This pressure may be supplied by a charge pump 65. Minimum constant low pressure is held by the charge pump 65. By selectively applying variable resistance to the third component, the ration between the rotation of the other 2 components can be continuously varied between the freewheeling mode and the locked mode.

A valve 46 interconnected to the first port 44 maybe operable to restrict flow of fluid from the first port 44. The resistance of the hydrostatic pump 36 to rotation forces placed on the ring gear 18 can be continuously varied by regulating the output of the hydrostatic pump 36 through the valve 46. If the valve 46 restricts the output of the hydrostatic pump 36, this flow restriction may result in greater resistance to compression of the pistons 39a,b as they rotate. This resistance will translate into a resistance to the rotation of the ring gear 18 which in turn may cause power to be transmitted from the first shaft to the third shaft. By regulating flow through the valve 46, the ration of the rotational rate of the first shaft with respect to the third shaft may be continuously varied. If the valve 46 used to restrict the output of the hydrostatic pump 36 is fully closed, no fluid may flow out of the hydrostatic pump 36. Nearly 100% of the rotational power delivered to the first shaft 12 may be transmitted to the third shaft 14. The first planetary gear set may function as a power dividing device if a load is applied to the ring gear 18, a rotational input applied to the first planetary carrier 16 may be split between the sun gear 19 and the ring gear 18.

The hydraulic fluid circuit 50 and the hydrostatic pump 36 may form a closed system where no external source of fluid is required and no fluid leaks from the system. The initial state of the vehicle drive train may be that the rotational power source is not providing rotational power, the valve 46 on the high pressure output side of the hydrostatic pump 36 is fully open, and the drive wheel 60 and hence the vehicle are locked in place by brakes of the vehicle. Since the valve 46 on the high pressure output side of the hydrostatic pump 36 is fully open, the ring gear 18 can rotate freely. Since the drive wheel 60 is locked by the brakes, the sun gear 19 will not rotate freely. When the power source 55 delivers rotational power, the first planetary carrier 16 will rotate the sun gear 19 while the ring gear 18 freewheels. At this point, a charge pump 65 is supplying pressure to the inlet/outlet ports 44,45 of the hydrostatic pump 36. Initiate movement of the vehicle, the brakes of the vehicle drive train may be released, and the valve 46 may be incrementally closed or throttled to restrict flow through the first port 44. The restriction of flow may result in a resistive torque being applied to the ring gear 18, which may result in a torque being applied to the sun gear 19. Once the resistive torque applied to the ring gear 18 meets or exceeds the resistive torque of the drive wheel 60, the vehicle begins to move. As the valve 46 is further closed, more torque flows to the drive wheel 60 and the vehicle will accelerate. When the valve 46 is completely closed, all the torque generated by the power source 55 may flow through the first planetary carrier 16, the sun gear 19 and the remainder of the drive train and to the drive wheel 60. The axial piston pumps 36 may also function as hydrostatic motors. If high pressure fluid is delivered to the second port 45, the fluid will impart an axial force on the pistons 39a,b which will cause the cylinder block 37 to rotate with the fluid passage 42 becoming the low pressure outlet. The hydrostatic pump 36 may be used as a starter motor by turning the ring gear 18 which in turn causes the first planetary carrier 16 to rotate thus rotating the crankshaft of the engine. Also, when the power source 60 is not running, the first planetary carrier 16 may be held stationary. High pressure fluid delivered to the hydrostatic motor may cause a torque being applied to the sun gear 19 and hence to the drive wheel 60. Depending upon which port, either forward or reward motion of the vehicle may be achieved.

In addition, the retrofit kit for an Allison transmission 10 generally comprises clutches 22,25,26,30 being disposed in the main housing 11 and being in operable communication to the gear sets. The clutches 22,25,26,30 include a clutch lockup member 26 being conventionally engaged to the third rotational member 14 and to the sun gear 19. The clutch lockup member 26 includes a plate member 27, a boss portion extending outwardly from a side of the plate member 27, a splined bore 28 being disposed through the boss portion and through the plate member 27 through which the third rotational member 14 is splined and rigidly connected to and also teeth being circumferentially spaced upon the side of the plate member 27. The gear sets further include a second planetary carrier 20 being conventionally disposed in the main housing 11. The clutches 22,25,26,30 also include a cone clutch 30 being conventionally engaged to the second planetary carrier 20. The cone clutch 30 includes a plate member 31 having a bore 32 being disposed therethrough with the shaft portion of the second planetary carrier 20 being disposed and engaged in the bore 32 and further having teeth 32 being circumferentially spaced near and about the bore 32 on a side of the plate member 31. The cone clutch 30 further includes a throw-out bearing 35 being in fluid communication to the fluid circuit 50 and also includes biased elements 34 such as springs being conventionally attached to the side of the plate member 31. The fluid circuit 50 when conventionally actuated supplies fluid at a selected pressure to move the throw-out bearing 35. Upon actuation of the fluid circuit 50 by conventional means, the teeth 29 of the clutch lockup member 26 are engaged to the teeth 33 of the cone clutch 30 upon fluid at a selected pressure from the fluid circuit 50 moving the cone clutch 30 relative to the clutch lockup member 26. The gear sets also include a second set of planetary gears 21 being conventionally carried by the second planetary carrier 20 and being in operable and conventional communication to the fourth rotational member 15.

Upon actuation of the fluid circuit 50, fluid moves the cone clutch 30 into engagement to the clutch lockup member 26 with the cone clutch 30 being in operable communication to the second set of planetary gears 21 via the second planetary carrier 20 thus transmitting rotational power from the sun gear 19 and the second rotational member 14 to the second set of planetary gears 21 and to the fourth rotational member 15 and to the drive wheel 60 to propel the vehicle as such. The gear sets further include a third planetary carrier 23 being disposed in the main housing 11 and conventionally carrying a third set of planetary gears 24 and being in operable and conventional communication to the second set of planetary gears 21 via a first clutch assembly 22 such as friction plates which are in operable and conventional communication to the second set of planetary gears 21. The third set of planetary gears 24 is in operable and conventional communication to the fourth rotational member 15 and to a second clutch assembly 25 such as friction plates.

Upon de-actuation of the fluid circuit 50 thus stopping the flow of fluid to the cone clutch 30, the biased elements 34 move the cone clutch out of engagement to the clutch lockup member 26 thus resulting in power being transmitted from the third rotational member 14 to the fourth rotational member 15 or to the third set of planetary gears 24 and from the third set of planetary gears 24 to the fourth rotational member 15 via the second clutch assembly 25.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the retrofit kit for an Allison transmission. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A retrofit kit for an Allison transmission comprising:
a main housing;
gear sets being disposed in said main housing and including rotational members, said gear sets including a first rotational member and a second rotational member and also including a ring gear being rigidly connected to said second rotational member;
clutches being in operable communication with said gear sets;
an axial piston pump being in operable communication with at least one of said rotational members and having ports, said second rotational member being in operable communication with said axial piston pump; and
a fluid circuit being in fluid communication with said axial piston pump through said ports and to at least one of said clutches.

2. The retrofit kit for an Allison transmission as described in claim 1, wherein said first rotational member is in operable communication with a drive source, and also includes a first planetary carrier being connected to said first rotational member, and further includes a first set of planetary gears being rotatably carried by said first planetary carrier, and also includes a sun gear being in operable communication with said first set of planetary gears.

3. The retrofit kit for an Allison transmission as described in claim 2, wherein said ring gear is in operable communication with said first set of planetary gears.

4. The retrofit kit for an Allison transmission as described in claim 3, wherein said second rotational member is collinear to said first rotational member.

5. The retrofit kit of an Allison transmission as described in claim 3, wherein said axial piston pump comprises a plurality of pistons and an angled swash plate.

6. The retrofit kit for an Allison transmission as described in claim 5, further comprising a charge pump attached to said hydraulic fluid circuit and being operable to supply fluid at a selected pressure to at least one of said ports on said axial piston pump.

7. The retrofit kit for an Allison transmission as described in claim 6, wherein said fluid circuit further includes a valve to selectively control flow of said fluid through at least one of said ports on said axial piston pump.

8. The retrofit kit for an Allison transmission as described in claim 7, wherein said valve is operable to selectively prevent flow of said fluid from said axial piston pump, wherein said a axial piston pump is operable to substantially prevent rotation of a selected said rotational member to which it is interconnected when said valve is substantially preventing flow of said fluid from said axial piston pump.

9. The retrofit kit for an Allison transmission as described in claim 8, wherein said axial piston pump also includes a cylinder block which is coupled to said second rotational member.

10. The retrofit kit for an Allison transmission as described in claim 9, wherein said axial piston pump further comprises a housing, said plurality of pistons being disposed to slidably interface with said angled swash plate, said second rotational member being a hollow shaft, said hollow shaft being rotatable relative to said housing, said hollow shaft being coaxial to said first rotational member, said hollow shaft being operable to rotate independently from said first rotational member.

11. A retrofit kit for an Allison transmission comprising:
a main housing;
gear sets being disposed in said main housing and including rotational members, said gear sets including a first rotational member being in operable communication with a drive source, and also including a first planetary carrier being connected to said first rotational member, and further including a first set of planetary gears being rotatably carried by said first planetary carrier, and also including a sun gear being in operable communication with said first set of planetary gears, said gear sets further including a third rotational member being engaged to said sun gear, said gear sets also including a second planetary carrier;
clutches being in operable communication with said gear sets, said clutches including a cone clutch being engaged to one of said planetary carriers and to said third rotational member and also including a clutch lockup member being engaged to one of said planetary carriers and to said third rotational member and also being engagable to said cone clutch;
an axial piston pump being in operable communication with at least one of said rotational members and having ports; and
a fluid circuit being in fluid communication with said axial piston pump through said ports and to at least one of said clutches.

12. The retrofit kit of an Allison transmission as described in claim 11, wherein said cone clutch is engaged to said second planetary carrier, and said clutch lockup member is engaged to said third rotational member.

13. The retrofit kit for an Allison transmission as described in claim 11, wherein said cone clutch includes a plate member having a bore disposed therethrough with one of said planetary carriers being engaged in said bore and further having teeth being circumferentially disposed on a side thereof.

14. The retrofit kit for an Allison transmission as described in claim 13, wherein said cone clutch further includes a throw-out bearing being in fluid communication with said fluid circuit; wherein upon actuation, said fluid circuit supplies fluid at a selected pressure to move said throw-out bearing.

15. The retrofit kit for an Allison transmission as described in claim 14, wherein said cone clutch also includes biased elements being mounted to a side of said plate member of said cone clutch; wherein upon stopping said fluid to said cone clutch, said biased elements move said cone clutch out of engagement to said clutch lockup member.

16. The retrofit kit for an Allison transmission as described in claim 15, wherein said clutch lockup member includes a plate member having a bore disposed therethrough and also having teeth being circumferentially spaced upon a side thereof, wherein said teeth of said clutch lockup member is engaged to said teeth of said cone clutch upon said fluid from said fluid circuit moving said cone clutch relative to said clutch lockup member.

17. The retrofit kit for an Allison transmission as described in claim 15, wherein said gear sets further include a fourth rotational member being in opearable communication with a drive wheel, said second planetary carrier being engaged to said cone clutch, and further include a second set of planetary gears being carried by said second planetary carrier and being in operable communication with at least one of said third and fourth rotational members; wherein upon said cone clutch and said clutch lockup member being engaged, power is transmitted from said sun gear to said second set of planetary gears.

18. The retrofit kit for an Allison transmission as described in claim 17, wherein said gear sets further include a third set of planetary gears being in operable communication with at least one of said third and fourth rotational members.

19. The retrofit kit for an Allison transmission as described in claim 18, wherein said clutches include first and second clutch assemblies being disposed in said main housing; wherein each of said first and second clutch assemblies is in operable communication with at least one of said second and third sets of planetary gears.

* * * * *